June 16, 1931. M. V. TREMBLAY 1,810,860
POT AND PAN COVER
Filed Jan. 19, 1931 2 Sheets-Sheet 1
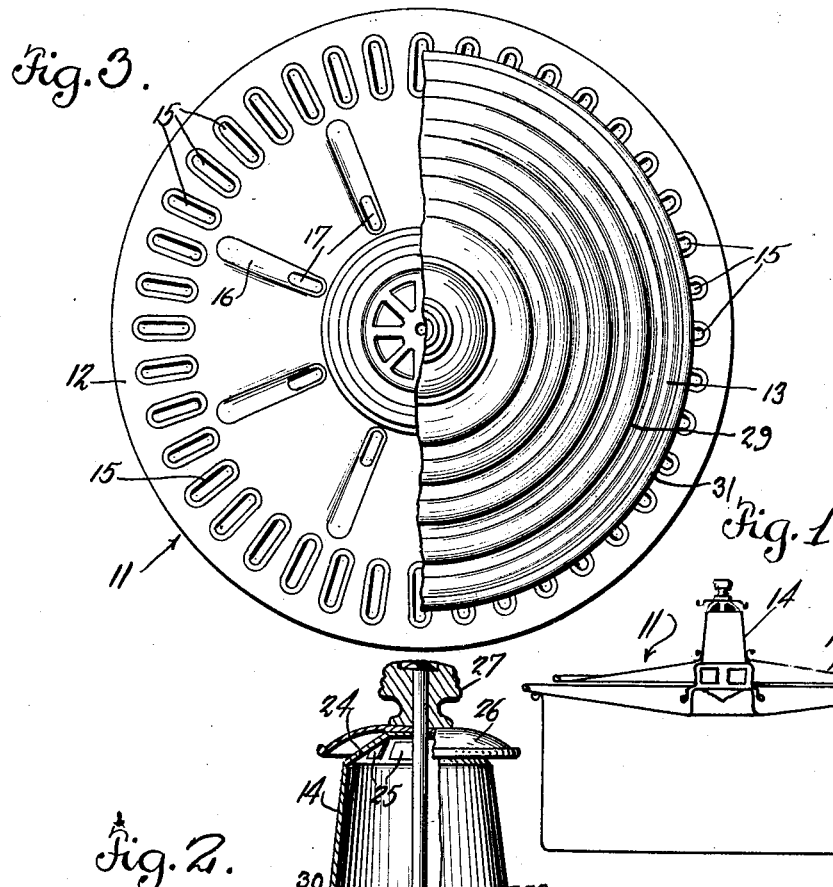
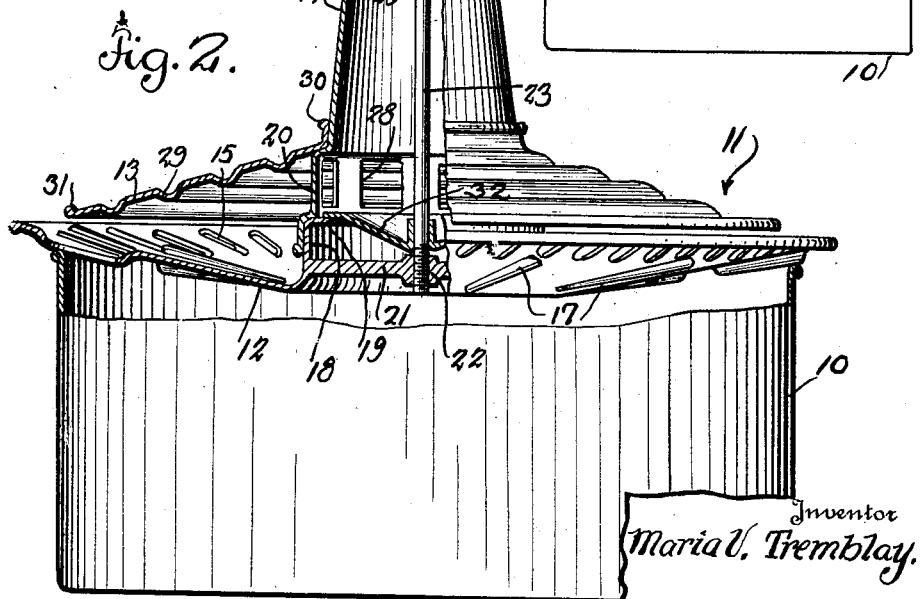
Inventor
Maria V. Tremblay.
By
Bryant & Lowry
Attorneys.

June 16, 1931. M. V. TREMBLAY 1,810,860
POT AND PAN COVER
Filed Jan. 19, 1931 2 Sheets-Sheet 2
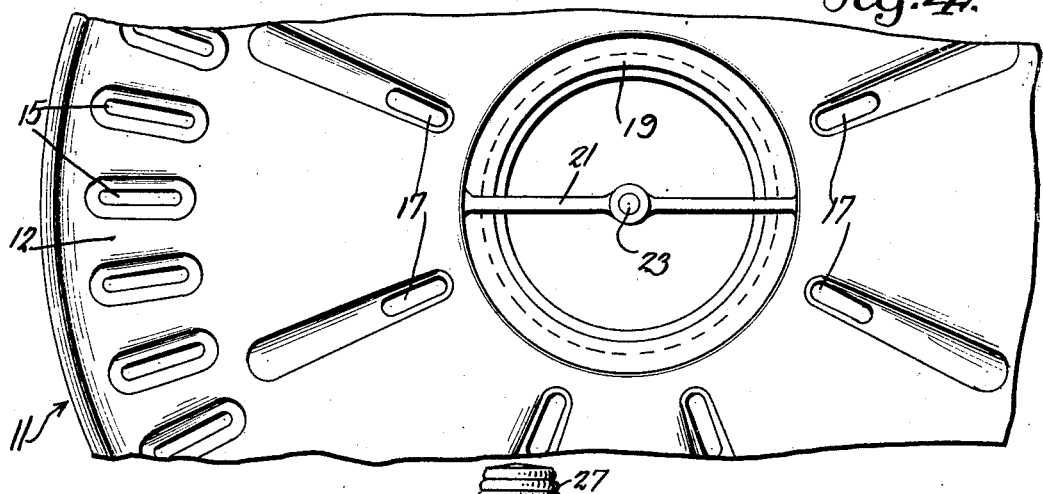
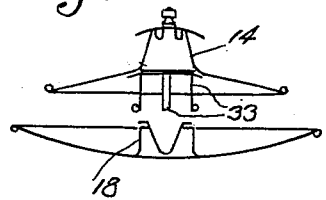
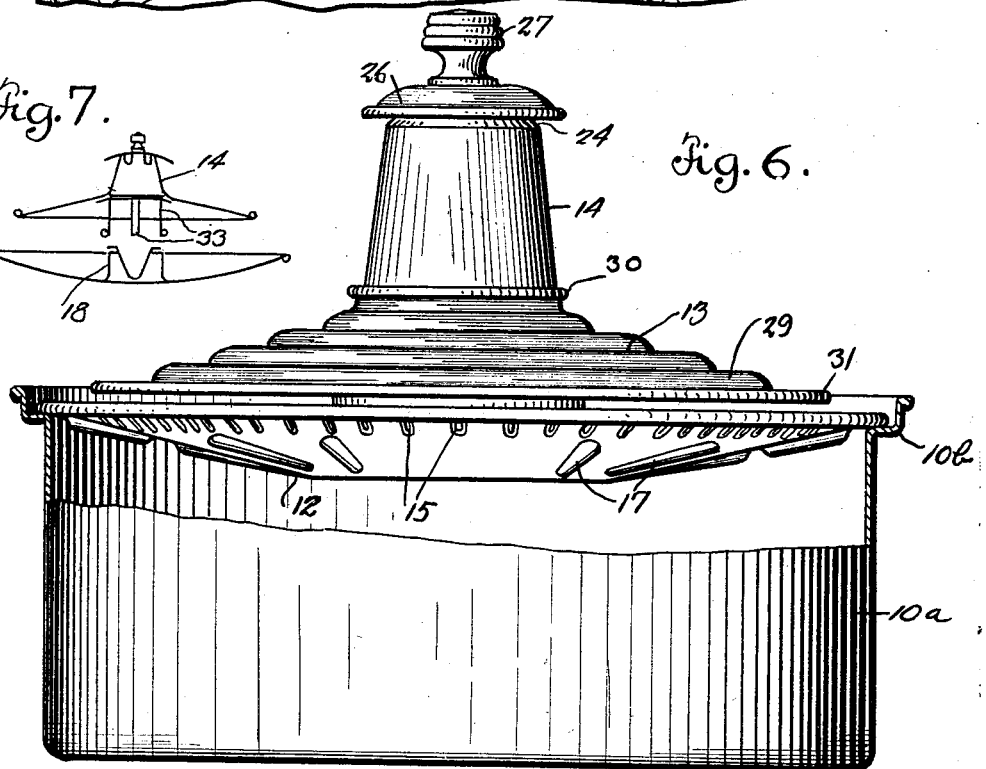
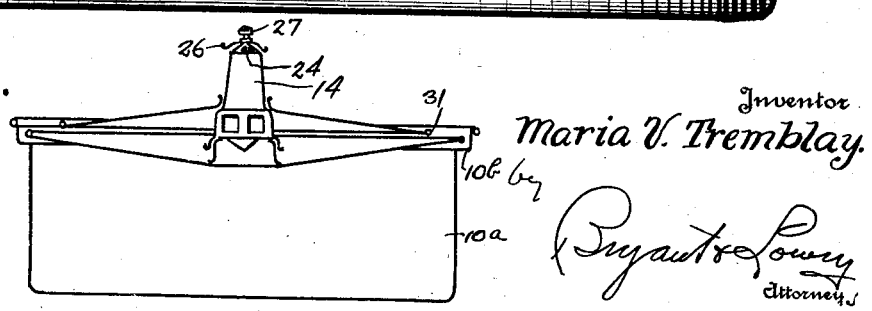
Inventor
Maria V. Tremblay.
by Bryant & Lowry
Attorneys Patented June 16, 1931

1,810,860

UNITED STATES PATENT OFFICE

MARIA V. TREMBLAY, OF WILLIMANTIC, CONNECTICUT

POT AND PAN COVER

Application filed January 19, 1931. Serial No. 509,785.

This invention relates to certain new and useful improvements in pot and pan covers.

The primary object of the invention is to provide a cover for pots, pans or the like wherein fluid contents of the container will be prevented from boiling over and any fluid substance moved into contact with the cover will be condensed and returned to the container, the cover being constructed to permit the natural escape of steam.

A further object of the invention is to provide a pot or pan cover of the foregoing character designed to promote a draft of air at room temperature therethrough for the cooling of the walls of the cover so that any boiling fluid flowing into contact with such walls will be condensed and returned to the pot or pan.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a diagrammatical side elevational view of a pot or pan and a cover constructed in accordance with the present invention, showing the cover resting upon and extending outwardly of the pot or pan permitting association with receptacles of different diameters;

Figure 2 is a fragmentary side elevational view, partly broken away and shown in section to illustrate the cover construction and showing the air passage through the cover and the valve forming a part thereof;

Figure 3 is a top plan view of the cover, partly broken away and illustrating the corrugated upper wall of the cover providing increased cooling surfaces for the boiling fluid and the return openings in the lower wall of the cover for condensation;

Figure 4 is an enlarged fragmentary bottom plan view of the cover;

Figure 5 is a diagrammatical side elevational view showing a cover set within a marginal flange of a pot or pan;

Figure 6 is a side elevational view, partly in section of the pot or pan and cover shown in Figure 5; and Figure 7 is a diagrammatical side elevational view of a modified form of cover showing the parts thereof separated.

Referring more in detail to the accompanying drawings and particularly to Figures 1 to 4, there is illustrated in Figure 1, a pot or pan 10 having a two-part cover 11 formed of lower and upper sections 12 and 13 respectively mounted upon and extending beyond the open upper end of the pan 10, the cover 11 carrying a centrally disposed stack 14 for the escape of steam from the pan, boiling fluid entering the lower end of the stack 14 contacting the lower face of the upper wall 13 to be condensed and returned through openings provided in the lower cover 12 to the pan, the cover sections 12 and 13 being spaced from each other to permit ingress of air or a draft upwardly through the stack 14 as an aid to condensation.

The bottom wall 12 of the cover is of concave formation as shown in Figure 2 and adjacent its peripheral edge is provided with a circular series of slotted openings 15 and inwardly of said openings 15, the wall 12 is provided with a circular series of depressions 16 having openings 17 at their inner ends effecting the drainage of condensation back to the pan 10. A central opening in the bottom wall 12 is surrounded by an upstanding annular wall 18 having an inwardly directed flange 19 at its upper end that provides a support for the lower flanged end 20 of the stack 14.

A cross bar or spider 21 extends between the annular wall 18, spanning the central opening in the wall 12 and has threaded in the central hub portion 22 thereof, the rod 23 projecting upwardly through the stack 14. The upper closed end 24 of the stack through which the rod 23 extends is provided with spaced openings 25 while a cap plate 26 mounted upon the upper end of the stack 14 in spaced relation to the openings 25 is retained in position on the stack by the button or knob 27 carried by the upper end of the rod 23. It will be noted from an inspection of Figure 2 that the rod 23 retains the stack 14 in position on the annular wall 18 of the bottom wall 12 of the cover.

As shown in Figures 1 and 2, the flanged lower end 20 of the stack 14 is provided with a series of openings 28 for purposes presently to appear. The upper cover wall 13 is annularly corrugated as at 29, the same being inclined in a direction reverse to the bottom wall 12 of the cover and has a central opening to facilitate mounting thereof upon the stack 14, the central opening being surrounded by a flange 30 resting upon the upper edge of the flange 20 at the lower end of the stack, the outer peripheral edge 31 of the upper cover wall 13 being spaced from the peripheral edge of the lower cover wall 12 to permit a draft of air to flow between the cover walls, pass through the openings 28 in the flange 20 of the stack and thence flow upwardly through the stack to escape through the openings 25. As shown in Figure 2, a disk valve 32 freely mounted upon the lower end of the rod 23 engages at its peripheral edge the flange 19 of the wall 18 for the retention of heat in the pan 10, and also acting as a check to prevent the contents of the pan from boiling over.

The cover 11 may be placed upon pots or pans of different sizes, while as shown in Figures 5 and 6, the cover is seated at its peripheral edge within a flange 10b on the pan 10a, the construction in Figures 5 and 6 otherwise remaining the same as described in connection with Figures 1 to 4. In the operation of the device, steam escapes through openings 15 into the space between the two cover walls 12 and 13 and a flow of cold air being induced through the cover, enters at the spaced marginal edges and outlets through the central stack, the steam being condensed for precipitation on the cover 12 to drain toward and through the openings 17 for return to the pan 10. The fluid contents of the pan, when boiling, will rise therein and contact the valve 32 and aided by relatively low speed pressures, the valve will rise and the fluid will flow through the openings 28 onto the cover 12 for return through the drain openings 17 to the pan. The escaping steam will flow upwardly through the stack 14 to be baffled and outlet at the upper end thereof, the escape of steam through the stack creating a draft between the cover walls 12 and 13 for cooling the walls to aid in condensation of steam escaping through openings 15. The valve 32 acts as a check to the fluid boiling over while such fluid in boiling over also comes into contact with the cool air flowing through the cover sections aiding in affecting condensation.

In the diagrammatic illustration of the invention as shown in Figure 7, the screw rod 23 for retaining the stack 14 in assembled relation to the cover wall 12 is eliminated, the stack 14 carrying depending spring arms 33 frictionally engage with the wall 18 of the lower cover, this form of the invention providing a simplified construction.

While there are herein shown and described the preferred embodiments of the invention, it is nevertheless to be understood that minor changes may be made therein without departing from the spirit and scope of the invention as claimed.

I claim:—

1. In a cover for pots, pans and the like, a double wall construction having a central passage therethrough and the outer edges of the walls being spaced to permit air to enter between the walls and flow upwardly through the central passage, a vertical stack surrounding the central passage and supported on one of the cover walls, the other cover wall being supported on the stack and said stack having openings therein permitting flow of air from between the covers to the central passage.

2. In a cover for pots, pans and the like, a double wall construction having a central passage therethrough and the outer edges of the walls being spaced to permit air to enter between the walls and flow upwardly through the central passage, a freely mounted valve in the central passage, a vertical stack surrounding the central passage and supported on one of the cover walls, the other cover wall being supported on the stack and said stack having openings therein permitting flow of air from between the covers to the central passage.

3. In a cover for pots, pans and the like, a double wall construction having a central passage therethrough and the outer edges of the walls being spaced to permit air to enter between the walls and flow upwardly through the central passage, a vertical stack surrounding the central passage and supported on one of the cover walls, the other cover wall being supported on the stack and said stack having openings therein permitting flow of air from between the covers to the central passage, and means for securing the stack to the cover wall supporting the same.

4. In a cover for pots, pans and the like, a double wall construction having a central passage therethrough and the outer edges of the walls being spaced to permit air to enter between the walls and flow upwardly through the central passage, a freely mounted valve in the central passage, a vertical stack surrounding the central passage and supported on one of the cover walls, the other cover wall being supported on the stack and said stack having openings therein permitting flow of air from between the covers to the central passage, and means for securing the stack to the cover wall supporting the same.

5. In a cover for pots, pans and the like, a double wall construction having a central passage therethrough and the outer edges of the walls being spaced to permit air to enter between the walls and flow upwardly through the central passage, a vertical stack surrounding the central passage and supported on one of the cover walls, the other cover wall being supported on the stack and said stack having openings therein permitting flow of air from between the covers to the central passage, means for securing the stack to the cover wall supporting the same, including a rod headed at its upper end engaged with the upper end of the stack, and having threaded engagement with the lower cover wall.

6. In a cover for pots, pans and the like, a double wall construction having a central passage therethrough and the outer edges of the walls being spaced to permit air to enter between the walls and flow upwardly through the central passage, a freely mounted valve in the central passage, a vertical stack surrounding the central passage and supported on one of the cover walls, the other cover wall being supported on the stack and said stack having openings therein permitting flow of air from between the covers to the central passage, means for securing the stack to the cover wall supporting the same, including a rod headed at its upper end engaged with the upper end of the stack, and having threaded engagement with the lower cover wall.

7. In a cover for pots, pans and the like, a double wall construction having a central passage therethrough and the outer edges of the walls being spaced to permit air to enter between the walls and flow upwardly through the central passage, a vertical stack surrounding the central passage and supported on one of the cover walls, the other cover wall being supported on the stack and said stack having openings therein permitting flow of air from between the covers to the central passage, and means for securing the stack to the cover wall supporting the same, including spring arms carried by one member for detachable engagement with the other member.

8. In a cover for pots, pans and the like, a double wall construction having a central passage therethrough and the outer edges of the walls being spaced to permit air to enter between the walls and flow upwardly through the central passage, a freely mounted valve in the central passage, a vertical stack surrounding the central passage and supported on one of the cover walls, the other cover wall being supported on the stack and said stack having openings therein permitting flow of air from between the covers to the central passage, and means for securing the stack to the cover wall supporting the same, including spring arms carried by one member for detachable engagement with the other member.

9. In a cover for pots, pans and the like, a double wall construction having a central passage therethrough and the outer edges of the walls being spaced to permit air to enter between the walls and flow upwardly through the central passage, and means in the lower end of the central passage to divert boiling over fluid laterally onto the bottom wall of the cover for return to the pot or pan.

In testimony whereof I affix my signature.

MARIA V. TREMBLAY.